US009315178B1

(12) United States Patent
Ferguson et al.

(10) Patent No.: US 9,315,178 B1
(45) Date of Patent: Apr. 19, 2016

(54) MODEL CHECKING FOR AUTONOMOUS VEHICLES

(75) Inventors: David I. Ferguson, San Francisco, CA (US); Dmitri A. Dolgov, Mountain View, CA (US); Christopher Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 13/446,025

(22) Filed: Apr. 13, 2012

(51) Int. Cl.
*B60W 50/02* (2012.01)
*B60W 50/04* (2006.01)
*B60T 8/171* (2006.01)
*B60T 8/172* (2006.01)
*B60T 17/22* (2006.01)

(52) U.S. Cl.
CPC .............. *B60T 8/172* (2013.01); *B60T 8/171* (2013.01); *B60T 17/221* (2013.01); *B60T 17/22* (2013.01); *B60T 2270/40* (2013.01); *B60W 50/0205* (2013.01); *B60W 50/04* (2013.01); *B60W 2050/021* (2013.01)

(58) Field of Classification Search
CPC ........ G07C 5/006; G07C 5/08; G07C 5/0808; G07C 5/0816; B60W 50/04; B60W 2050/022; B60W 2050/0205; B60W 2050/04; B60C 2019/004; B60C 11/243; B60C 11/246; B60T 2240/00; B60T 2240/07; B60T 2240/08; B62D 5/0481
See application file for complete search history.

(56) References Cited

U.S. PATENT DOCUMENTS

| 6,070,682 | A  | * | 6/2000  | Isogai et al. ................. 180/167 |
| 6,186,259 | B1 | * | 2/2001  | Shimizu et al. ............... 180/204 |
| 6,459,982 | B1 | * | 10/2002 | Kobayashi et al. ............. 701/93 |
| 6,554,089 | B2 | * | 4/2003  | Sato et al. ..................... 180/169 |
| 6,655,502 | B2 | * | 12/2003 | Sokoll et al. ............. 188/1.11 W |
| 7,089,099 | B2 |   | 8/2006  | Shostak et al. |
| 7,809,480 | B2 |   | 10/2010 | Segal |
| 7,877,216 | B2 | * | 1/2011  | Wright et al. .................... 702/34 |
| 2001/0037171 | A1 | * | 11/2001 | Sato ............................... 701/70 |
| 2004/0127329 | A1 | * | 7/2004  | Eich et al. ....................... 477/34 |
| 2004/0154715 | A1 | * | 8/2004  | Dufournier ................. 152/154.2 |
| 2005/0150283 | A1 | * | 7/2005  | Shick et al. ..................... 73/146 |
| 2007/0208482 | A1 | * | 9/2007  | Thiede et al. .................... 701/70 |
| 2008/0236269 | A1 | * | 10/2008 | Howell et al. .................... 73/121 |
| 2009/0079839 | A1 |   | 3/2009  | Fischer et al. |
| 2009/0164059 | A1 | * | 6/2009  | Takeda ............................. 701/29 |
| 2009/0287368 | A1 | * | 11/2009 | Bonne .............................. 701/29 |
| 2009/0319113 | A1 |   | 12/2009 | Lee |
| 2010/0106356 | A1 |   | 4/2010  | Trepagnier et al. |
| 2010/0114428 | A1 | * | 5/2010  | Kurata et al. .................... 701/36 |

(Continued)

FOREIGN PATENT DOCUMENTS

WO      2011142508 A1      11/2011

*Primary Examiner* — Fadey Jabr
*Assistant Examiner* — Kevin P Mahne
(74) *Attorney, Agent, or Firm* — McDonnell Boehnen Hulbert & Berghoff LLP

(57) ABSTRACT

In an example method, a vehicle configured to operate in an autonomous mode could predict an output of the vehicle based on an input provided to control the vehicle and a state of the vehicle. The method could include receiving an indication of an input from at least one input-indication sensor and an indication of an output from at least one output-indication sensor. A predicted output value could be calculated based on the indication of the input and a state of the vehicle. The predicted output value could be compared with the indication of the output. If the comparison is not within a threshold range, an alert indicator could be created. Upon creating the alert indicator, an alert action could be activated.

11 Claims, 6 Drawing Sheets

(56) References Cited

U.S. PATENT DOCUMENTS

| | | | |
|---|---|---|---|
| 2010/0211249 A1* | 8/2010 | McClellan | 701/29 |
| 2010/0235065 A1* | 9/2010 | Logan et al. | 701/80 |
| 2011/0035149 A1 | 2/2011 | McAndrew et al. | |
| 2011/0066313 A1 | 3/2011 | Larsson et al. | |
| 2011/0071718 A1* | 3/2011 | Norris et al. | 701/23 |
| 2011/0118927 A1 | 5/2011 | Cima | |
| 2011/0221587 A1* | 9/2011 | Katou | 340/443 |
| 2012/0136546 A1* | 5/2012 | Stratton et al. | 701/70 |

\* cited by examiner

MODEL CHECKING FOR AUTONOMOUS VEHICLES

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully automated. For instance, when a vehicle is in an automated mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In a first aspect, an apparatus is provided. The apparatus includes at least one input-indication sensor configured to provide an indication of an input provided to control a vehicle. The vehicle is configured to operate in an autonomous mode. The apparatus further includes at least one output-indication sensor configured to provide an indication of an output of the vehicle. The apparatus also includes a processor configured to: i) calculate a predicted output value based on the indication of the input and a state of the vehicle; ii) compare the predicted output value with the indication of the output; and iii) if the comparison is not within a threshold range, create an alert indicator. The apparatus yet further includes an alert module configured to activate an alert action responsive to the processor creating the alert indicator.

In a second aspect, a method is provided. The method includes receiving, from at least one input-indication sensor, an indication of an input provided to control a vehicle. The vehicle is configured to operate in an autonomous mode. The method additionally includes receiving, from at least one output-indication sensor, an indication of an output of the vehicle. The method also includes calculating a predicted output value using a processor. The predicted output value is based on the indication of the input and a state of the vehicle. The method further includes comparing, using the processor, the predicted output value with the indication of the output. The method yet further includes if the comparison is not within a threshold range, the processor responsively creating an alert indicator. The method also includes activating an alert action responsive to the processor creating the alert indicator.

In a third aspect, an article of manufacture including a tangible non-transitory computer-readable medium having stored instructions is provided. The instructions are executable by a computer system to cause the computer system to perform functions. The functions include receiving an indication of an input provided to control a vehicle from at least one input-notification sensor. The vehicle is configured to operate in an autonomous mode. The functions further include receiving an indication of an output of the vehicle from at least one output-notification sensor. The functions also include calculating a predicted output value. The predicted output value is based on the indication of the input and the state of the vehicle. The functions yet further include comparing the predicted output value with the indication of the output. The functions additionally include if the comparison is not within a threshold range responsively creating an alert indicator. The functions further include activating an alert action responsive to the alert indicator.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
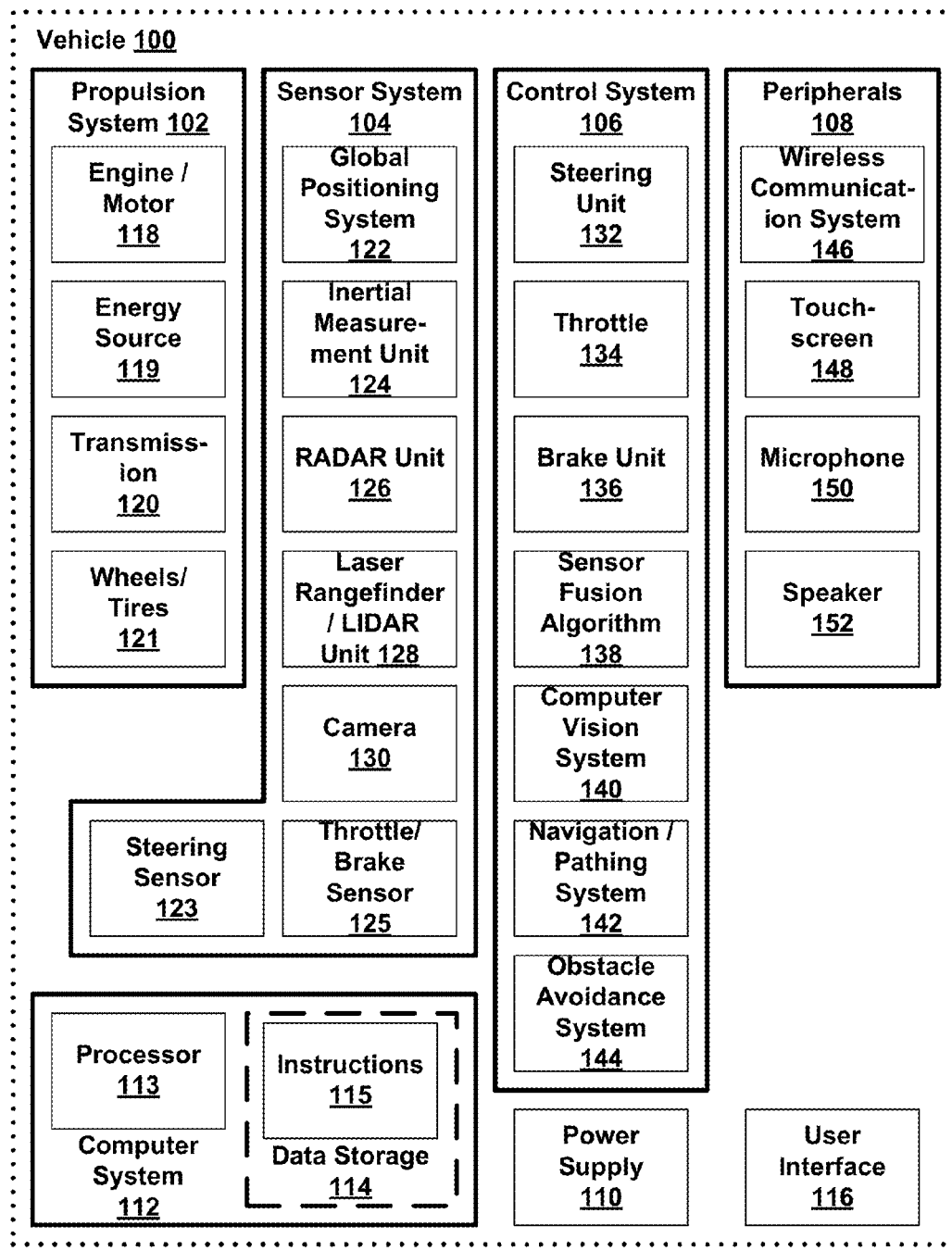
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to receiving sensor data regarding at least one indication of an input provided to control a vehicle and at least one indication of an output of the vehicle, calculating a predicted output value based on the at least one indication of the input and a state of the vehicle, comparing the predicted output value with the indication of the output, if the comparison is not within a threshold range, responsively creating an alert indicator, and activating an alert action in response to the creation of the alert indicator.

Within the context of the disclosure, the vehicle could be operable in various modes of operation. Depending on the embodiment, such modes of operation could include manual, semi-autonomous, and autonomous modes. In particular, the autonomous mode may provide driving operation with little or no user interaction. Manual and semi-autonomous modes of operation could provide for driving operations with a greater degree of user interaction.

Additionally, the vehicle could be operated in a safety mode. The safety mode could represent an autonomous, semi-autonomous, or manual mode in which the vehicle may be controlled to operate in a safe fashion. Such safety modes of operation could include the vehicle autonomously pulling over to the side of a road and/or the vehicle returning some or all operational control of the vehicle to a driver or another control system.

Some methods disclosed herein could be carried out in part or in full by a vehicle configured to operate in an autonomous mode with or without external interaction (e.g., such as from a user of the vehicle). In one such example, a vehicle could receive, from at least one input-indication sensor, an indication of an input provided to control a vehicle. The at least one input-indication sensor could include sensors that may provide information about the inputs provided to various elements and subsystems of the vehicle. For instance, the input-indication sensor could sense an electrical input signal applied to the throttle of the vehicle.

The vehicle could receive, from one or more output-indication sensors, an indication of an output of the vehicle. Such output-indication sensors could include sensors that may monitor the wheel speed of the vehicle or may monitor the current location of the vehicle (e.g., a Global Positioning System).

The vehicle could calculate, using a processor, a predicted output value. The predicted output value could be based on the indication of the input and a state of the vehicle. The processor could be a computer system located onboard the vehicle. In other embodiments, the computer system could be located partially or completely separate from the vehicle. The vehicle could determine a predicted output value of the vehicle based on the input provided to the vehicle control systems.

The predicted output value could also be calculated based, at least in part, on a state of the vehicle. For instance, the determination of the predicted output value may include consideration of the state of various subsystems of the vehicle. For example, a wear coefficient (e.g., of a brake system or of a tire) could be considered when calculating the predicted output value. Wear coefficients may vary based on usage of the vehicle. Other information related to the state of the vehicle could be taken into account when calculating the predicted output value.

A comparison could be made (for instance, by a computer system on-board the vehicle) between the predicted output value and the indication of the output (which could be termed an actual output value). In an example embodiment, a comparison could include determining a difference between a predicted speed of a vehicle (the predicted output value) and the actual speed of the vehicle (the actual output value).

If the comparison is not within a threshold range, the computer system located on-board the vehicle could responsively create an alert indicator. In an example embodiment, the threshold range is 5 miles per hour. If the predicted speed of the vehicle and the actual speed of the vehicle differ by more than 5 miles per hour, an alert indicator may be created.

In response to an alert indicator being created, an alert action could be activated by the computer system located on-board the vehicle. Alert actions could include, but should not be limited to, changing a driving mode of the vehicle to a safe driving mode, slowing the vehicle to a stop, pulling the vehicle over to a side of a road, releasing control of the vehicle back to a driver. Other alert actions are possible.

The methods disclosed herein could additionally or alternatively be carried out in part or in full by a server, such as one or more nodes of a server network. In an example embodiment, a server or computer may receive an indication of an input provided to control a vehicle as well as an indication of an output of the vehicle. Such indications could include any current input to at least one component or subsystem of the vehicle (e.g., throttle position, brake position, steering position). Further, the server may receive information related to a state of the vehicle. Such information could include positions and relative speeds of other obstacles/vehicles in the environment of the vehicle, as well as the vehicle's current speed, heading, location, road conditions, road angle, etc.

The indication of an input provided to control a vehicle could be used by the server to determine one or more predicted output values based on the indication of the input to the vehicle as well as the state of the vehicle. The server may compare the predicted output value with the indication of the output of the vehicle. Further, if the comparison is not within a threshold range, the server could create an alert indicator. Additionally, in response to the alert indicator being created, the server could activate an alert action. The alert action could involve the server controlling the vehicle to enter a safety mode or to take other actions. Other interactions between a vehicle operating in an autonomous mode and a server (or other computer) are possible within the context of the disclosure.

Also disclosed herein are non-transitory computer readable media with stored instructions. The instructions could be executable by a computing device to cause the computing device to perform functions similar to those described in the aforementioned methods.

It is understood that there are many different specific methods and systems that could be used in: i) receiving, from at least one input-indication sensor, an indication of an input provided to control a vehicle, ii) receiving, from at least one output-indication sensor, an indication of an output of the vehicle, iii) calculating a predicted output value using a processor, the predicted output value being based on the indication of the input and the state of the vehicle, iv) comparing the predicted output value with the indication of the output, v) if the comparison is not within a threshold range, responsively creating an alert indicator, and vi) activating an alert action responsive to the alert indicator being created. Each of these specific methods and systems are contemplated herein, and several example embodiments are described below.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to receive sensor data related to an indication of an input provided to control a vehicle, receive sensor data related to an indication of an output of the vehicle, calculate a predicted output value based on the indication of the input and a state of the vehicle, comparing the predicted output value with the indication of the output, if the comparison is not within a threshold range, creating an alert indicator, and activating an alert action in response to the alert indicator being created. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a RADAR 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The RADAR 126 may represent a system that utilizes radio signals to sense objects, and in some cases their speed and heading, within the local environment of the vehicle 100. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters.

In other words, a combination of various sensors (which could be termed input-indication and output-indication sensors) and the computer system 112 could interact to provide an indication of an input provided to control a vehicle or an indication of an output of the vehicle.

The computer system 112 could carry out several determinations based on the indications received from the input- and output-indication sensors. For example, the computer system 112 could calculate a predicted output value. The predicted output value could be based on several factors including the indication of the input provided to the vehicle (e.g., throttle signal, brake signal, steering signal, etc.) as well as a state of the vehicle (e.g., vehicle speed, direction of movement, etc.). The state of the vehicle may also include the current state of the environment of the vehicle (e.g., grade of the road, relative location and speed of other vehicles, location of obstacles, etc.).

For instance, in a first scenario, if the vehicle 100 is traveling on a road at a constant speed, and receives an instruction to accelerate, one predicted output value could be related to a speed increase or a rate of speed increase (acceleration) based on the applied throttle signal.

In a second scenario, if the vehicle 100 is traveling down the road at a constant speed, and receives an instruction to slow down, one predicted output value could be the speed decrease or rate of speed decrease (deceleration) based on the applied brake signal.

In a third scenario, if the vehicle 100 is traveling down the road at a constant speed, and receives an instruction to turn, one predicted output value could be a change in the steering angle of the vehicle (relative to a forward vehicle direction, for instance) based on the applied steering signal.

The computer system 112 could further use the current environment of the vehicle 100 in the determination for each predicted output value. For instance, in the first scenario, the slope of the road may affect the acceleration of the vehicle 100. The computer system 112 could determine that the vehicle may accelerate more quickly than normal, for instance due to a downward slope of a road. Thus, the predicted output value may vary based on the geography of a specific portion of a road.

In the second scenario, the slope of the road may affect the deceleration of the vehicle 100. The computer system 112 could determine that the vehicle may decelerate more slowly than normal, due to, for instance, a downward slope of the road.

In the example embodiment, the computer system 112 could work with data storage 114 and other systems in order to control the control system 106 based on at least on the predicted output value. For example, some of the sensor systems may measure the actual output value of the vehicle 100. Thus, the actual output value of the vehicle 100 could correspond with an indication of the output of the vehicle 100 as-received from at least one output-notification sensor.

The computer system 112 may be further configured to compare the predicted output value with the actual output value. If the difference between the predicted and the actual output values is greater than a threshold, the computer system 112 may create an alert indicator.

In response to the alert indicator, the vehicle 100 could activate an alert action. In some embodiments, the alert action may cause vehicle 100 to operate in a safety mode or a reduced function mode, also known as limp mode. In another embodiment, the alert action may disable vehicle 100 completely. In an additional embodiment, the alert indicator and/or the alert action may be communicated to an operator of vehicle 100 or elsewhere. Other examples of interconnection between the components of vehicle 100 are numerous and possible within the context of the disclosure.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
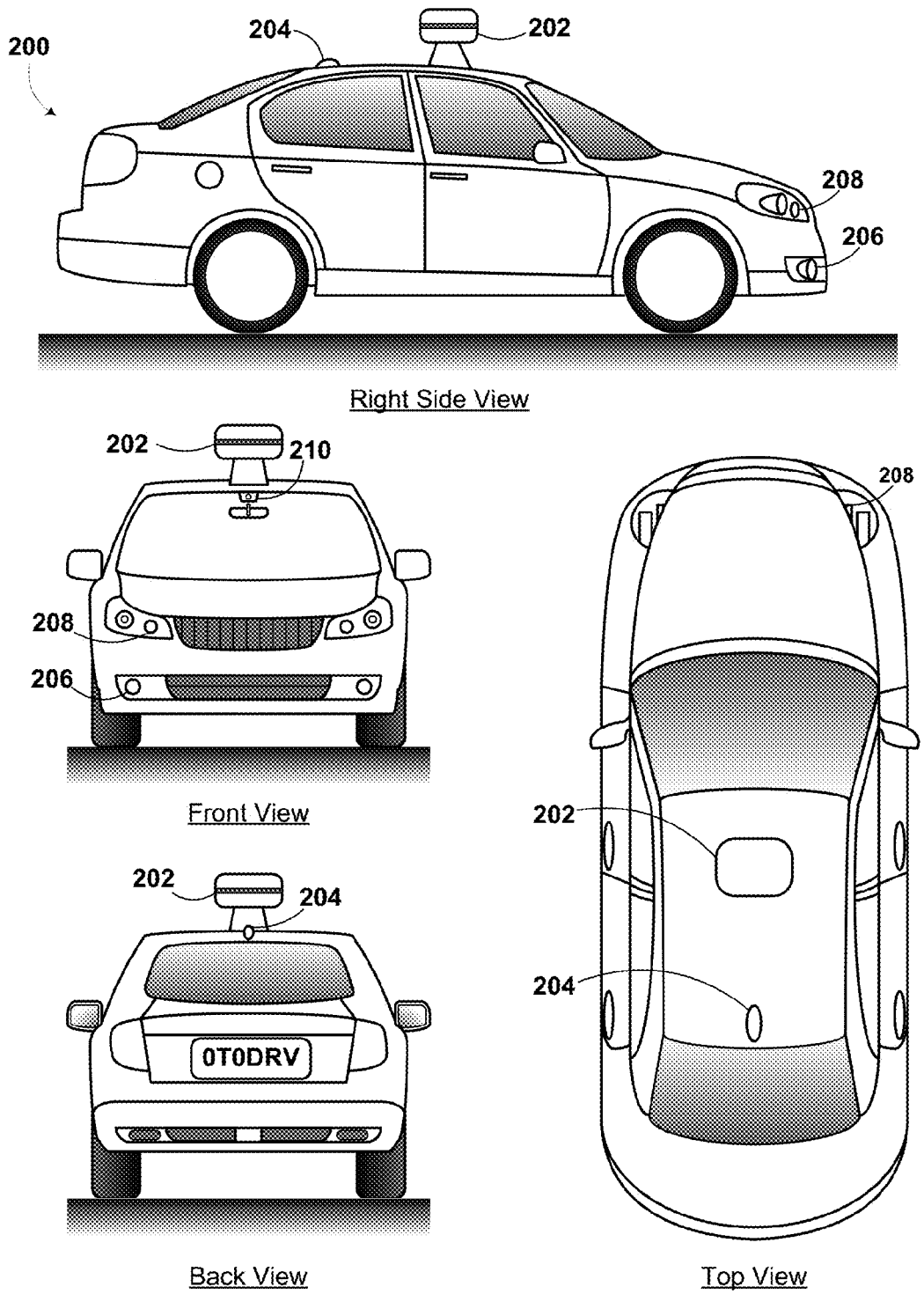
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a LIDAR 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
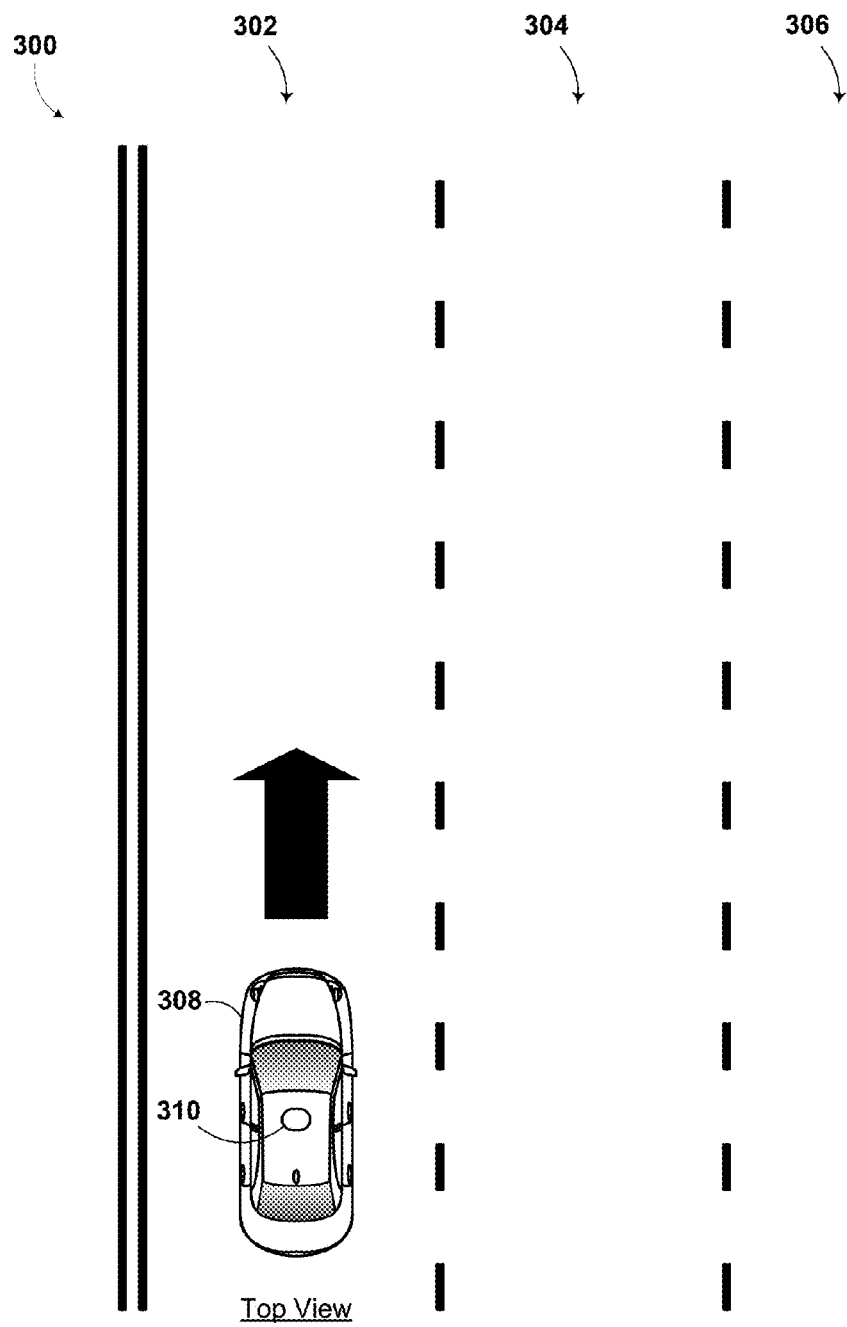
FIG. 3A is a top view of an autonomous vehicle operating scenario, according to an example embodiment.

FIG. 3A illustrates a scenario 300 involving a roadway with a left-most lane 302, a center lane 304, and a right-most lane 306. A vehicle 308 could be operating in an autonomous mode and in the left-most lane 302. The vehicle 308 may be traveling with a constant speed. The sensor unit 310 of the vehicle 308 could be capturing sensor data based on an environment of the vehicle 308. In particular, a camera could capture a plurality of images of the road way, including the three lanes 302, 304, and 306 to determine the current state of the environment of the vehicle 308. Other sensors associated with the vehicle 308 could be operable to provide the speed, heading, location, and other data such that the computer system of the vehicle 308 could determine the state of the vehicle 308.

The vehicle 308 may receive an instruction to increase the speed at which the vehicle is traveling. When the vehicle receives the instruction to increase its speed, a throttle signal may be created and/or received. Based upon the throttle signal and the determination of environmental conditions (e.g., roadway slope, roadway surface, etc.), the computer system could further determine a predicted output value of the vehicle 308. The predicted output value may include a speed difference or a rate of change (acceleration) of the speed of the vehicle 308.

In other embodiments, vehicle 308 may receive an instruction to decrease the speed at which the vehicle is traveling. When the vehicle receives the instruction to decrease its speed, a brake signal may be created and/or received. Based upon the brake signal and the determination of environmental conditions, the computer system could further determine a predicted output value of the vehicle 308. The predicted output value may be a speed or deceleration of the vehicle 308.

Within the context of FIG. 3A, predicted output values may be determined based on the throttle signal and current vehicle operating parameters (such as speed and heading). Additionally, the predicted output values could be based on the state of the vehicle 308, which could include one or more aspects of the environment of the vehicle 308.

For instance, if the environment of the vehicle 308 indicates a road is flat, the calculated predicted output value may be based on the throttle signal and current vehicle parameters (such as speed and heading). However, if the environment of the vehicle 308 indicates a road is has a grade to it (i.e. it is either sloped upward or downward), the grade may be included in the calculation of the predicted output value. Thus, the state of the vehicle (which may include one or more relevant aspects of the environment) could be used when calculating the predicted output value.

The vehicle may have mathematical models for the speed and acceleration output of the vehicle based on at least an applied throttle signal and/or brake signal. For example, the mathematical model may take as an input some or all of (i) the throttle signal, (ii) the brake signal, (iii) the parameters of the environment of the vehicle 308, and (iv) the current vehicle parameters. The mathematical model will use at least a subset of criteria (i)-(iv) to calculate the predicted output value of the vehicle 308.

In further embodiments, the vehicle may update the mathematical model for wear of vehicle components with the inclusion of a wear coefficient. For example, as the vehicle 308 drives, the brakes of vehicle 308 may wear down. For a given brake signal input value, the distance needed to stop the vehicle 308 may increase as the brakes wear. Additionally, the rate at which the vehicle slows may decrease when the brakes wear. Other components of the vehicle 308 may include a wear coefficient. Wear coefficients could include any value, expression, equation, or function operable to at least partially compensate for a change in the performance of a given component of vehicle 308. Any combination of wear coefficients may be used in the mathematical models so as to calculate a predicted output value.

Wear coefficients could include calculated wear coefficients, which could be an estimate of the actual wear of a component of the vehicle 308. For instance, a calculated brake wear coefficient could be estimated or calculated based on the number of times the brakes have been actuated. Other types of calculated wear coefficients are possible.

Alternatively or additionally, wear coefficients could include measured wear coefficients. Such measured wear coefficients could be measured by a subsystem of the vehicle at various intervals or continuously. For example, a measured brake wear coefficient could be generated based on a measurement of the brake pad thickness. Alternatively, the measured wear coefficient could be based on previous vehicle performance data. For example, for a given brake signal, the vehicle could be measured to decelerate at a given rate. Based on the given rate of deceleration, a measured brake wear coefficient could be determined. Other ways of determining measured wear coefficients are possible.

While the vehicle 308 is calculating a predicted output value, the vehicle may exhibit an actual output value. Various sensors on the vehicle may be capable of measuring the actual output value of the vehicle 308. In an example embodiment, a throttle signal may increase the speed of the vehicle 308. Thus, sensors, such as a GPS sensor, speed sensor, and/or cameras, may be able to determine an actual output value, which may represent an actual speed of the vehicle 308 in the example embodiment.

The vehicle 308 may compare the predicted output value with the actual output value of the vehicle 308. If the difference between predicted and actual output values is greater than a threshold, the vehicle 308 may create an alert indicator. In response to the alert indicator, an alert action could be activated. For example, an alert action may cause the vehicle 308 to operate in a reduced function mode, such as a limp mode or a safety mode.

In another embodiment, an alert action may disable vehicle 308 completely. In some embodiments, when the vehicle 308 is being disabled, it may automatically drive itself to the shoulder of the road and come to a stop. In the example shown in FIG. 3A, the vehicle may automatically change lanes and pull off the side of road across lane 306. Additionally, the vehicle 308 may also flash its hazard lights when an alert is created. Further, in some embodiments, the vehicle 308 may place a phone call or establish a data connection requesting service when the alert is created. In an additional embodiment, the alert indicator and/or the alert action may be communicated to an operator of vehicle 308 or to a server. Other alert indicators and alert actions are possible within the context of this disclosure.

Figure 3B:
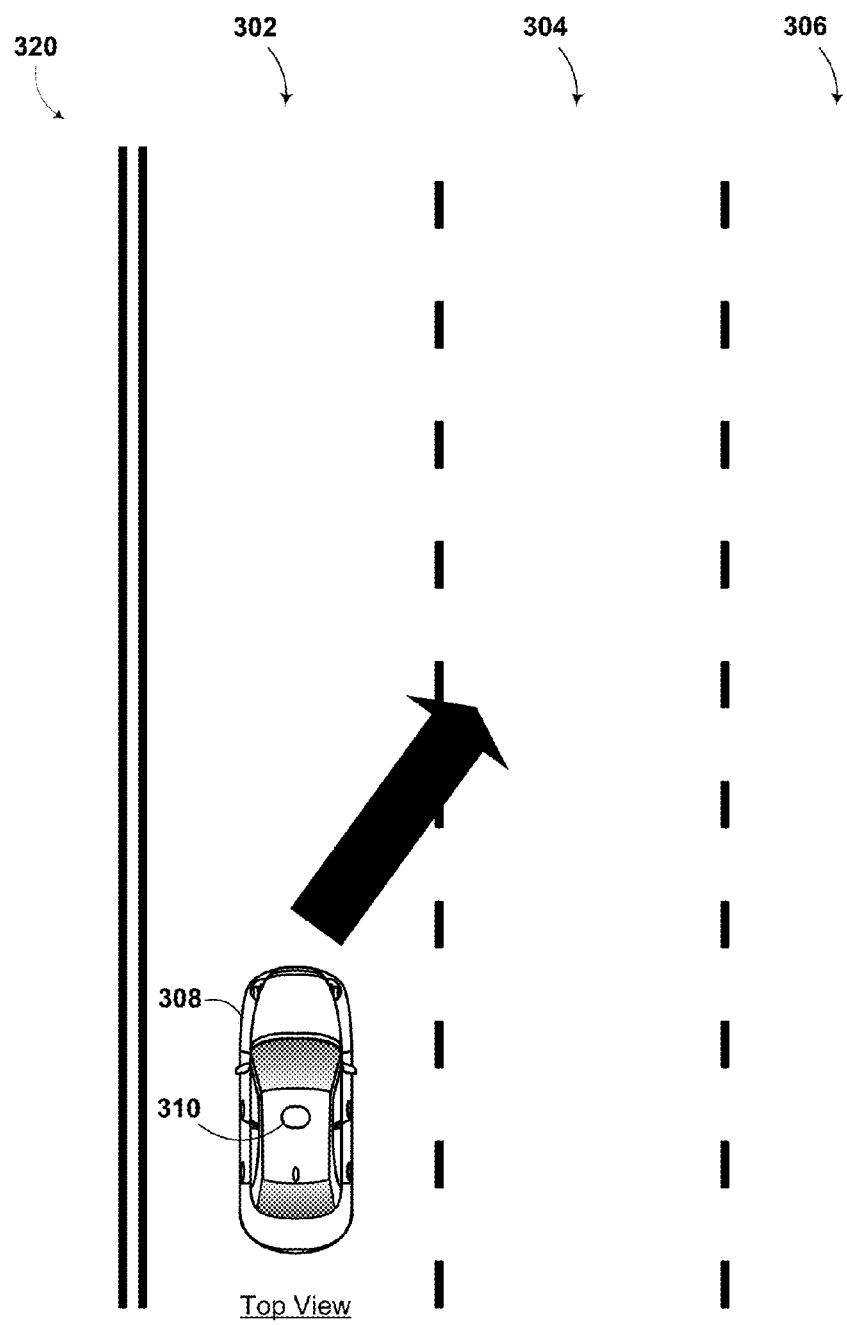
FIG. 3B is a top view of an autonomous vehicle operating scenario, according to an example embodiment.

FIG. 3B illustrates a scenario 320 similar to that in FIG. 3A but with a steering motion rather than an acceleration or deceleration. FIG. 3B illustrates a scenario 320 involving a roadway with a left-most lane 302, a center lane 304, and a right-most lane 306. A vehicle 308 could be operating in an autonomous mode and in the left-most lane 302. The vehicle 308 may be traveling with a constant speed. The sensor unit 310 of the vehicle 308 could be capturing sensor data based on an environment of the vehicle 308. In particular, a camera could capture a plurality of images of the road way, including the three lanes 302, 304, and 306 to determine a state of the vehicle 308. Other sensors associated with the vehicle 308 could be operable to provide the speed, heading, location, throttle signal, steering signal, and other data such that the computer system of the vehicle 308 could receive indications of inputs provided to the vehicle 308 as well as indications of outputs of the vehicle 308.

In scenario 320, the vehicle 308 may receive an instruction to change lanes from lane 302 to lane 304. When the vehicle receives the instruction to change lanes, it may create and/or receive a steering signal. Based on the steering signal and the state of the vehicle, the computer system could further determine a predicted output value of the vehicle 308. The predicted output value may be a motion of the vehicle 308 (e.g., a velocity vector or a change of location).

Within the context of FIG. 3B, predicted output values may be calculated based on the steering signal and a state of the vehicle 308. The state of the vehicle could include current vehicle operating parameters (such as speed and heading). Additionally, the state of the vehicle 308 could include at least one aspect of the environment of the vehicle 308. Thus, the predicted output values may be calculated based on at least one aspect of the environment of the vehicle 308.

For instance, if the environment of the vehicle 308 indicates a road is flat, the calculated predicted output value may be based on the steering signal and current vehicle parameters (such as speed and heading). However, if the environment of the vehicle 308 indicates a road is has a grade to it (i.e. it is either sloped upward or downward), the relevant aspect of the environment (in this case, the slope of the roadway) may be included in the calculation of the predicted output value.

The vehicle may have mathematical models for the motion output of the vehicle based on an applied steering signal. For example, the mathematical model may take as an input some or all of (i) the steering signal, (ii) the parameters of the environment of the vehicle 308, and (iii) the current vehicle parameters. The mathematical model will use at least a subset of criteria (i)-(iii) to calculate the predicted output value of the vehicle 308.

Additionally, the vehicle may update the mathematical model for the motion output of the vehicle 308 for wear of vehicle components. The updating of the mathematical model for wear of vehicle may be similar to that described with respect to FIG. 3B. Further, while the vehicle 308 is calculating predicted output value, the vehicle 308 may include an actual output value.

Similar to as described with respect to FIG. 3A, the vehicle 308 may compare the predicted output value with the actual output value executed by the vehicle. If the comparison is not within a threshold range, an alert indicator (similar to the alert indicator described with respect to FIG. 3A) may be created for the steering embodiment as well.

In response to the alert indicator, an alert action could be activated. Alert actions similar to those described in reference to FIG. 3A are possible in this embodiment.

3. Example Methods

Figure 4:
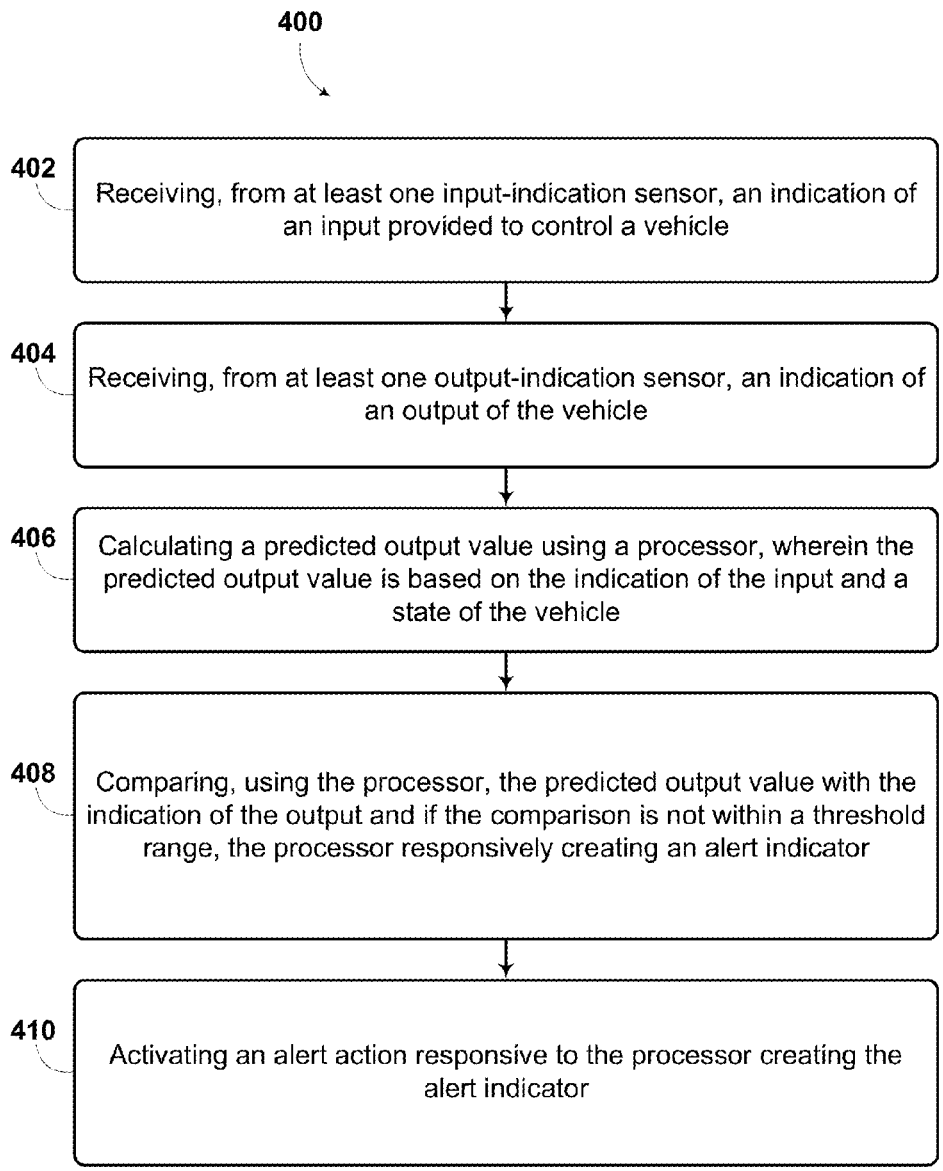
FIG. 4 shows a method, according to an example embodiment.

A method 400 is provided for receiving an indication of an input provided to control a vehicle, receiving an indication of an output of the vehicle, calculating a predicted output value based on the indication of the input and a state of the vehicle, comparing the predicted output value with the indication of the output; if the comparison is not within a threshold range creating an alert indicator, and activating an alert action responsive to the processor creating an alert indictor. The method could be performed using any of the apparatus shown in FIGS. 1-3 and described above; however, other configurations could be used. FIG. 4 illustrates the steps in an example method, however, it is understood that in other embodiments, the steps may appear in different order and steps could be added, subtracted, or modified.

Step 402 includes receiving an indication of an input provided to control a vehicle. The vehicle is configured to operate in an autonomous mode. The vehicle described in this method could be the vehicle 100 and/or vehicle 200 as illustrated and described in reference to FIGS. 1 and 2, respectively. Receiving an indication of an input provided to the vehicle could include receiving a throttle signal, brake signal, or a steering signal from at least one input-indication sensor. Other types of an indication of an input provided to the vehicle are possible. The signals may be created by components of the vehicle or they may include signals applied to the vehicle. For example, the vehicle may be made to accelerate as indicated by a throttle signal created by a computer. Depending upon the embodiment, the signals may be made fully or in part by a server network and communicated to the vehicle.

Step 404 includes receiving an indication of an output of the vehicle. The output of the vehicle may be a movement of the vehicle. The output of the vehicle could be measured by one or more output-indication sensor. The vehicle may speed up, slow down, turn, change course, or keep the same movement as part of the output. The output may be the speed, acceleration, heading, or any other indicator of the motion (or lack thereof) of the vehicle. The indication of the output of the vehicle could be received from at least one output-indication sensor. Additionally, the vehicle may be stopped, thus the output may indicative of the vehicle having no motion. Other types of indication of an output of the vehicle are possible.

Step 406 includes calculating a predicted output based on the indication of the input and a state of the vehicle. Possible predicted output values could include any combination of a speed, a rate of change of speed (acceleration), a heading, or any other indicator of the motion (or lack thereof) of the vehicle associated with driving on or off a roadway. For example, a vehicle may be traveling at 15 miles per hour and a throttle signal may be provided. A mathematical calculation within the vehicle may predict the throttle signal will cause the vehicle to accelerate to 22 miles per hour. Thus, the predicted output value could be 22 miles per hour. Alternatively, the predicted output value could be expressed in terms of a rate of change of speed (such as in units of miles per hour per hour). The predicted output value could be expressed in other ways as well.

In other embodiments, the vehicle may receive a brake signal. The vehicle may responsively slow down. The mathematical calculation within the vehicle may predict the brake signal will cause the vehicle to decelerate to 10 mile per hour. Yet other predicted output values could include the heading of vehicle, a turning of the vehicle, or other indicator of motion of the vehicle. The computer system of the vehicle could perform the calculation or any other computing device located internal or external to the vehicle. Other ways of calculating predicted output values are possible.

The predicted output values may be calculated based on a state of the vehicle. In some example embodiments, the state of the vehicle could include a speed, a heading, a throttle signal, a brake signal, or any other aspect of the vehicle related to the indication of the input and which may be included in the calculation of the predicted output value. Additionally, the state of the vehicle may include aspects of the environment of the vehicle that could be included in the calculation of the predicted output value. For example, if the roadway is sloping downward, the slope angle of the roadway could be taken into account when calculating the predicted output value. Other aspects of the environment of the vehicle could be included in such a calculation.

Step 408 includes comparing the predicted output value with the indication of the output; if the comparison is not within a threshold range responsively creating an alert indicator. The computer system of the vehicle could perform the comparison. In one embodiment as described above, a throttle signal indicates a vehicle should accelerate. The mathematical model indicated the vehicle will accelerate to 22 miles per hour. An indication of an output from step 404 may indicate the vehicle is traveling 21.8 miles per hour. Thus, the comparison may indicate a difference between actual speed and predicted speed of 0.2 mile per hour. This difference may be compared to a threshold. The threshold may be static (i.e. a specific value) or a function based on a vehicle parameter (e.g. the threshold may be a function of the vehicle's speed). The threshold could depend on other factors as well. In some example embodiments, a difference between the actual and predicted speeds of 0.2 miles per hour may be below an example threshold and the vehicle may continue normal operation.

In further embodiments, the difference between actual speed and predicted speed may be greater than the threshold. When the difference is greater than the threshold, an alert indicator may be created. The alert indicator may indicate a function of the vehicle is not performing correctly.

In some additional embodiments, the comparison may use a criterion other than the vehicle's speed. For example, the vehicles acceleration, heading, position, etc. may be used for the comparison. Any parameter that may indicate a motion (or lack thereof) of the vehicle may be used for the purposes of the comparison.

In other embodiments, the vehicle may have an opposite signaling behavior. The comparison may create an indicator when the vehicle is operating normally. A lack of a normal operation signal may be equivalent to the presence of an alert indicator. The two concepts are interchangeable.

Step 410 includes activating an alert action responsive to the processor creating an alert indictor. The alert action may take several forms. In one embodiment, the vehicle may provide a notification to passengers within the vehicle. The notification may be one or more of an error light, an alert sound, text alert on a screen, or other alert indicator. The alert action may include allowing the passenger to take control of the vehicle and drive it safely.

In another embodiment, the alert action may cause the vehicle to slow down and come to a stop. In some embodiments, the vehicle may determine a safe way to stop. For example, the vehicle may change lanes and pull on to the shoulder of the road. In other embodiments, the vehicle may come to a stop as quickly as safely possible.

The vehicle may provide an alert to other vehicles indicative of the alert action. For example, the vehicle may make an audible noise to alert other vehicles. Additionally, the vehicle may flash the various lights on the outside of the vehicle in response to the alert action. Other types of alerts to other vehicles are possible, such as a vehicle-to-vehicle communication message, such as a DSRC message.

If further embodiments, the vehicle may communicate information related to the alert. For example, the vehicle may alert a repair shop of an alert action. In additional embodiments, the vehicle may be able to diagnose problems with itself in response to the creation of the alert indicator. Additionally, the vehicle may be able to provide an alert to a vehicle rental service. Thus, a new vehicle may be delivered to replace the vehicle causing the alert. In additional embodiments, the vehicle may perform some combination of the disclosed actions.

Example methods, such as method 400 of FIG. 4, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

It will be understood that there are other similar methods that could describe receiving an indication of an input provided to control a vehicle, receiving an indication of an output of the vehicle, calculating a predicted output value based on the indication of the input and a state of the vehicle, comparing the predicted output value with the indication of the output; if the comparison is not within a threshold range creating an alert indicator, and activating an alert action responsive to the processor creating an alert indictor. Those similar methods are implicitly contemplated herein.

Figure 5:
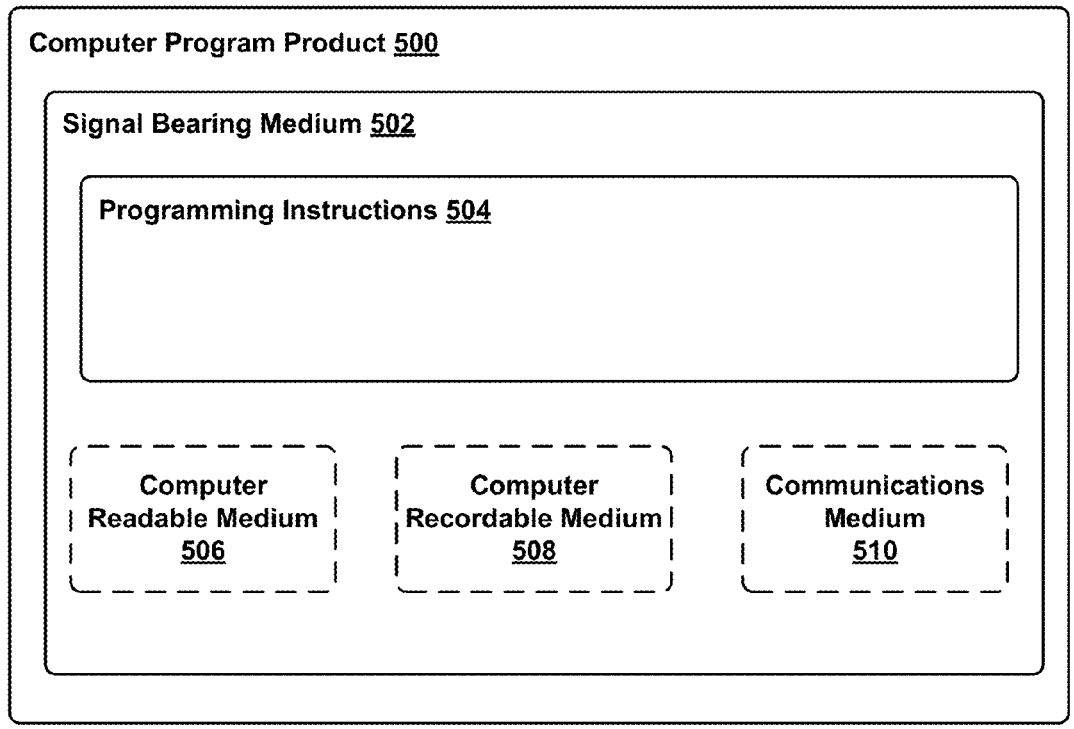
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. An apparatus comprising:
    at least one input-indication sensor configured to provide an indication of an input provided to a braking system of a vehicle, wherein the vehicle is operating the braking system in an autonomous mode;
    at least one output-indication sensor configured to provide an indication of an output associated with the braking system of the vehicle;
    a processor configured to:
    i) calculate a predicted output value associated with the braking system based on the indication of the input received from the at least one input-indication sensor, a state of the vehicle, and on a coefficient indicative of a value used to at least partially compensate for a change in a performance of the braking system of the vehicle, wherein the predicted output value associated with the braking system is further based on a wear coefficient indicative of wear associated with the braking system;
    ii) compare the predicted output value with the indication of the output; and
    iii) if the comparison is not within a threshold range, create an alert indicator indicative of a malfunction of the braking system of the vehicle; and
    a computing system having an alert module for activating an alert action responsive to the processor creating the alert indictor.

2. The apparatus of claim 1, wherein the wear coefficient indicative of wear associated with the braking system is a calculated wear coefficient associated with the braking system of the vehicle.

3. The apparatus of claim 1, wherein the wear coefficient indicative of wear associated with the braking system is a measured wear coefficient associated with the braking system of the vehicle.

4. The apparatus of claim 1, wherein the at least one input-indication sensor is configured to measure a pressure applied to a pedal of the vehicle.

5. The apparatus of claim 1, wherein the at least one input-indication sensor is configured to measure an electrical signal.

6. The apparatus of claim 1, wherein the at least one output-indication sensor is configured to measure a speed associated with the vehicle.

7. The apparatus of claim 1, wherein the at least one output-indication sensor is configured to measure a Global Positioning System signal.

8. The apparatus of claim 1, wherein the alert action comprises operating the vehicle in a safety mode.

9. The apparatus of claim 1, wherein the alert action comprises stopping a movement of the vehicle.

10. The apparatus of claim 1, wherein the state of the vehicle comprises at least one of a speed of the vehicle, a heading of the vehicle, and a current environment of the vehicle.

11. A method comprising:
    receiving, at a computing system from at least one input-indication sensor, an indication of an input provided to a braking system of a vehicle, wherein the computing system is operating the braking system in an autonomous mode;
    receiving, at the computing system from at least one output-indication sensor, an indication of an output of the braking system of the vehicle;
    determining, by the computing system, a predicted output value based on the indication of the input, a state of the vehicle, and a wear coefficient indicative of wear associated with the braking system, wherein the state of the vehicle includes at least a speed of the vehicle;
    determining whether the predicted output value is within a threshold range of the indication of the output; and
    based on determining that the predicted output value is not within the threshold range of the indication of the output, causing, by the computing system, the braking system to perform an alert action that includes at least reducing the speed of the vehicle.

* * * * *